(12) United States Patent
Goldner et al.

(10) Patent No.: US 9,217,801 B2
(45) Date of Patent: Dec. 22, 2015

(54) FIBER OPTIC ACOUSTIC SENSOR ARRAYS AND SYSTEMS, AND METHODS OF FABRICATING THE SAME

(75) Inventors: Eric Lee Goldner, Valencia, CA (US); James Kengo Andersen, Westlake Village, CA (US); Agop Hygasov Cherbettchian, Santa Monica, CA (US)

(73) Assignee: Pacific Western Bank, Los Angeles, CA (US)

( * ) Notice: Subject to any disclaimer, the term of this patent is extended or adjusted under 35 U.S.C. 154(b) by 510 days.

(21) Appl. No.: 13/414,157

(22) Filed: Mar. 7, 2012

(65) Prior Publication Data

US 2012/0227504 A1    Sep. 13, 2012

Related U.S. Application Data

(60) Provisional application No. 61/450,257, filed on Mar. 8, 2011.

(51) Int. Cl.
| | |
|---|---|
| *G01H 9/00* | (2006.01) |
| *G01S 15/88* | (2006.01) |
| *B29C 70/08* | (2006.01) |
| *G02B 6/00* | (2006.01) |
| *G01V 1/22* | (2006.01) |
| *B29C 70/72* | (2006.01) |

(52) U.S. Cl.
CPC ................ *G01V 1/226* (2013.01); *B29C 70/72* (2013.01); *G01H 9/00* (2013.01)

(58) Field of Classification Search
CPC .......... G01H 9/00; G01H 9/004; B29C 70/72; G01V 1/226

USPC .......................................................... 73/655
See application file for complete search history.

(56) References Cited

U.S. PATENT DOCUMENTS

| | | | |
|---|---|---|---|
| 4,155,005 A | 5/1979 | Knowlton et al. | |
| 4,255,015 A | 3/1981 | Adams et al. | |
| 4,292,628 A | 9/1981 | Sadler | |
| 4,800,267 A | 1/1989 | Freal et al. | |
| 4,826,322 A | 5/1989 | Philips | |

(Continued)

FOREIGN PATENT DOCUMENTS

| | | |
|---|---|---|
| JP | 2001-221684 | 8/2001 |
| JP | 2006-172339 | 6/2006 |

(Continued)

OTHER PUBLICATIONS

International Search Report for International Application No. PCT/US2010/025248 issued by the Korean Intellectual Property Office on Oct. 11, 2011.

(Continued)

*Primary Examiner* — J M Saint Surin
(74) *Attorney, Agent, or Firm* — Stradley Ronon Stevens & Young, LLP

(57) ABSTRACT

A fiber optic acoustic sensor system. The fiber optic acoustic sensor system includes an optical source, and a fiber optic acoustic sensor array configured to receive an optical signal from the optical source. The fiber optic acoustic sensor array includes a core, a first polymer layer disposed on the core, an optical fiber wound around the first polymer layer, and a second polymer layer disposed on the first polymer layer such that the optical fiber is between the first polymer layer and the second polymer layer.

20 Claims, 8 Drawing Sheets

(56) References Cited

U.S. PATENT DOCUMENTS

| | | | |
|---|---|---|---|
| 4,879,755 | A | 11/1989 | Stolarczyk et al. |
| 4,893,930 | A | 1/1990 | Garrett et al. |
| 4,994,668 | A | 2/1991 | Lagakos et al. |
| 5,011,262 | A | 4/1991 | Layton |
| 5,051,799 | A | 9/1991 | Paul et al. |
| 5,172,117 | A | 12/1992 | Mills et al. |
| 5,227,857 | A | 7/1993 | Kersey |
| 5,367,376 | A | 11/1994 | Lagakos et al. |
| 5,397,891 | A | 3/1995 | Udd et al. |
| 5,493,390 | A | 2/1996 | Varasi et al. |
| 5,680,489 | A | 10/1997 | Kersey |
| 5,712,932 | A | 1/1998 | Alexander et al. |
| 5,798,834 | A | 8/1998 | Brooker |
| 5,986,749 | A | 11/1999 | Wu et al. |
| 6,104,492 | A | 8/2000 | Giles et al. |
| 6,157,711 | A | 12/2000 | Katz |
| 6,281,976 | B1 | 8/2001 | Taylor et al. |
| 6,328,837 | B1 | 12/2001 | Vohra et al. |
| 6,381,048 | B1 | 4/2002 | Chraplyvy et al. |
| 6,453,022 | B1 | 9/2002 | Weinman, Jr. |
| 6,654,521 | B2 | 11/2003 | Sheng et al. |
| 6,819,812 | B2 | 11/2004 | Kochergin et al. |
| 6,891,621 | B2 | 5/2005 | Berg et al. |
| 6,900,726 | B2 | 5/2005 | Graves |
| 6,980,709 | B2* | 12/2005 | Carlson et al. ................ 385/12 |
| 7,013,729 | B2 | 3/2006 | Knudsen et al. |
| 7,282,697 | B2 | 10/2007 | Thomas et al. |
| 7,683,312 | B2 | 3/2010 | Goldner et al. |
| 7,840,105 | B2 | 11/2010 | Goldner et al. |
| 7,994,469 | B2 | 8/2011 | Goldner et al. |
| 7,999,946 | B2 | 8/2011 | Andersen et al. |
| 2002/0063866 | A1* | 5/2002 | Kersey et al. ................ 356/478 |
| 2002/0064331 | A1 | 5/2002 | Davis et al. |
| 2002/0064332 | A1 | 5/2002 | Martin |
| 2002/0131729 | A1* | 9/2002 | Higgins, III ................... 385/91 |
| 2003/0094281 | A1 | 5/2003 | Tubel |
| 2003/0145654 | A1 | 8/2003 | Knudsen et al. |
| 2004/0046111 | A1 | 3/2004 | Swierkowski |
| 2004/0060697 | A1 | 4/2004 | Tilton |
| 2004/0246816 | A1 | 12/2004 | Ogle |
| 2005/0076713 | A1 | 4/2005 | Knudsen |
| 2005/0097955 | A1 | 5/2005 | Berg et al. |
| 2005/0111788 | A1 | 5/2005 | Tsuyama |
| 2006/0120675 | A1* | 6/2006 | Goldner et al. ............... 385/104 |
| 2007/0065149 | A1 | 3/2007 | Stevens et al. |
| 2008/0137589 | A1 | 6/2008 | Barrett |
| 2009/0101800 | A1 | 4/2009 | Goldner et al. |
| 2009/0140852 | A1 | 6/2009 | Stolarczyk et al. |
| 2009/0210168 | A1 | 8/2009 | Vincelette |
| 2010/0005860 | A1 | 1/2010 | Coudray et al. |
| 2010/0219334 | A1 | 9/2010 | LeGrand |
| 2010/0313658 | A1* | 12/2010 | Andersen et al. ......... 73/514.26 |

FOREIGN PATENT DOCUMENTS

| | | |
|---|---|---|
| JP | 2007-232515 | 9/2007 |
| KR | 10-2002-0008457 | 1/2002 |
| WO | 99/05493 | 2/1999 |
| WO | 2011050227 | 4/2011 |

OTHER PUBLICATIONS

International Search Report for International Application No. PCT/US2010/053659 issued by the Korean Intellectual Property Office on Aug. 2, 2011.
International Search Report for International Application No. PCT/US2010/053763 issued by the Korean Intellectual Property Office on Jul. 28, 2011.
International Search Report for International Application No. PCT/US2011/024465 issued by the Korean Intellectual Property Office on Oct. 27, 2011.
International Search Report for International Application No. PCT/US2011/025206 issued by the Korean Intellectual Property Office on Oct. 17, 2011.
International Search Report for International Application No. PCT/US2012/022356 issued by the Korean Intellectual Property Office on Sep. 3, 2012.
International Search Report for International Application No. PCT/US2012/028224 issued by the Korean Intellectual Property Office on Sep. 24, 2012.
1st Office Action dated May 31, 2013 issued by the State Intellectual Property Office (SIPO) of the People's Republic of China for Chinese Patent Application No. 201080047796.6.

* cited by examiner

FIBER OPTIC ACOUSTIC SENSOR ARRAYS AND SYSTEMS, AND METHODS OF FABRICATING THE SAME

RELATED APPLICATIONS

This application claims the benefit of priority to U.S. Provisional Patent Application Ser. No. 61/450,257, filed on Mar. 8, 2011, the content of which is incorporated in this application by reference.

TECHNICAL FIELD

This invention relates generally to the field of sensor systems and, more particularly, to improved fiber optic acoustic sensor systems.

BACKGROUND OF THE INVENTION

Fiber optic acoustic sensor arrays have been in development for years as a replacement for electronic-based (typically piezoelectric) sensor arrays. An exemplary use for such arrays is in connection with underwater sonar applications. A driver for this change in technology has been the fact that fiber optic sensors eliminate the need for electronics in the wet end of the system (i.e., in the water). The design and packaging of electronics to survive in a seawater environment is complicated, and has been a major cost contributor to underwater sonar systems. In addition, the resulting reliability of electronics in these systems has been less than optimal.

A generally accepted method of making fiber optic hydrophones for such sonar applications has been the air-backed mandrel (i.e., winding/bonding optical fiber around the outside of a flexible hollow cylinder). As the cylinder responds to acoustic pressure waves (e.g., underwater acoustic signals), the wound fiber varies in length, which causes a phase shift in the light passing through the optical fiber. The phase shift is measurable when the sensor is configured as an interferometer.

It is known that applying certain coatings directly to the entire optical fiber during manufacturing (and prior to incorporation into a sensor) can increase the acoustic sensitivity of the optical fiber (e.g., by a factor of 100 or more). This development may substantially eliminate the need for an air-backed mandrel to enhance the acoustic sensitivity of the optical fiber; however, the process to apply such a coating directly onto the entire optical fiber (as well as a methodology to package the coated fiber into an acoustic array) is labor intensive and therefore, often cost prohibitive.

Thus, a need exists for, and it would be desirable to provide, improved fiber optic acoustic sensor arrays and systems, and methods of fabricating the same.

BRIEF SUMMARY OF THE INVENTION

To meet this and other needs, and in view of its purposes, the present invention provides, according to an exemplary embodiment, a fiber optic acoustic sensor array. The fiber optic acoustic sensor array includes a core, a first polymer layer disposed on the core, an optical fiber wound around the first polymer layer, and a second polymer disposed on the first polymer layer such that the optical fiber is between the first polymer layer and the second polymer layer. In certain exemplary embodiments of the present invention, the fiber optic acoustic array may be included in a fiber optic acoustic sensor system including an optical source, where the fiber optic acoustic array is configured to receive an optical signal from the optical source.

According to another exemplary embodiment of the present invention, another fiber optic acoustic sensor array is provided. The fiber optic acoustic sensor array includes a core, an optical fiber wound around the core, and a plurality of coiled fiber portions provided along the optical fiber, the coiled fiber portions being coated with a polymer coating. In certain exemplary embodiments of the present invention, the fiber optic acoustic array may be included in a fiber optic acoustic sensor system having an optical source, where the fiber optic acoustic array is configured to receive an optical signal from the optical source.

According to another exemplary embodiment of the present invention, a method of fabricating a fiber optic acoustic sensor array is provided. The method includes the steps of: (a) providing a core; (b) applying a first polymer layer on the core; (c) winding an optical fiber on the first polymer layer; and (d) applying a second polymer layer over the first polymer layer and over the wound optical fiber.

According to another exemplary embodiment of the present invention, a method of fabricating a fiber optic acoustic sensor array is provided. The method includes a step of providing a core. The method also includes the step of providing an optical path along the core, the optical path having (1) an optical fiber wound on the core, and (2) a plurality of coiled fiber portions interspersed along the optical fiber wound on the core, the plurality of coiled fiber portions being coated with a polymer material.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

According to the various exemplary embodiments of the present invention, improved fiber optic acoustic sensor arrays (and improved methods of fabricating such arrays), as well as improved fiber optic acoustic sensor systems, are provided. The present invention has particular applicability to underwater towed fiber optic acoustic sensor arrays (sometimes referred to as 'seismic streamers' and 'towed arrays'); however, the present invention is not limited to such applications.

Figure 1A:
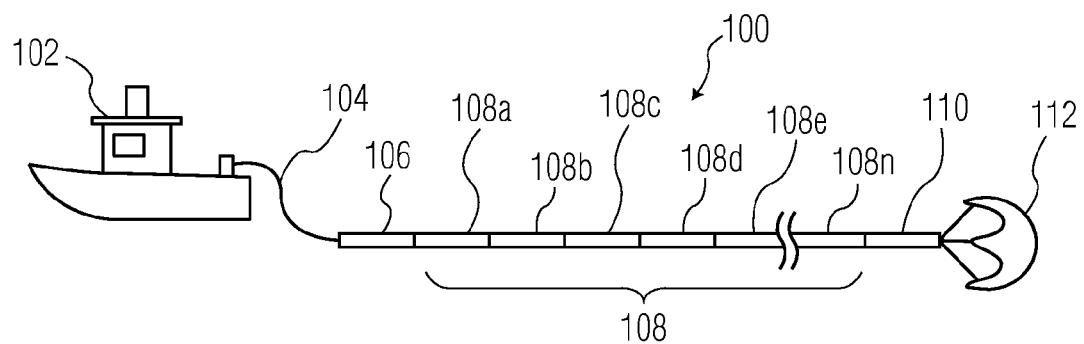
FIG. 1A is a block diagram of a fiber optic acoustic array included in a towed streamer system in accordance with an exemplary embodiment of the present invention.

FIG. 1A illustrates a fiber optic acoustic sensor system 100 provided in connection with a marine vessel 102. Fiber optic acoustic sensor system 100 includes certain elements on vessel 102 (none of which are shown in FIG. 1A) such as an optical source, an optical receiver, an interrogation system, etc. as are desired in a particular application. Fiber optic acoustic sensor system 100 also includes a tow cable 104, a fiber optic acoustic sensor array 108, a first vibration isolation module (VIM) 106 (e.g., for reducing longitudinal vibration induced on sensor array 108), a second vibration isolation module (VIM) 110, and a drogue 112 (e.g., for providing drag to increase the tension along sensor array 108). Fiber optic acoustic sensor array 108 includes a plurality of acoustic modules 108a, 108b, 108c, 108d, 108e, . . . , 108n. Elements 106, 108a, 108b, 108c, 108d, 108e, . . . , 108n, and 110 are connected via respective couplings 114 (See FIG. 1B).

Figure 1B:
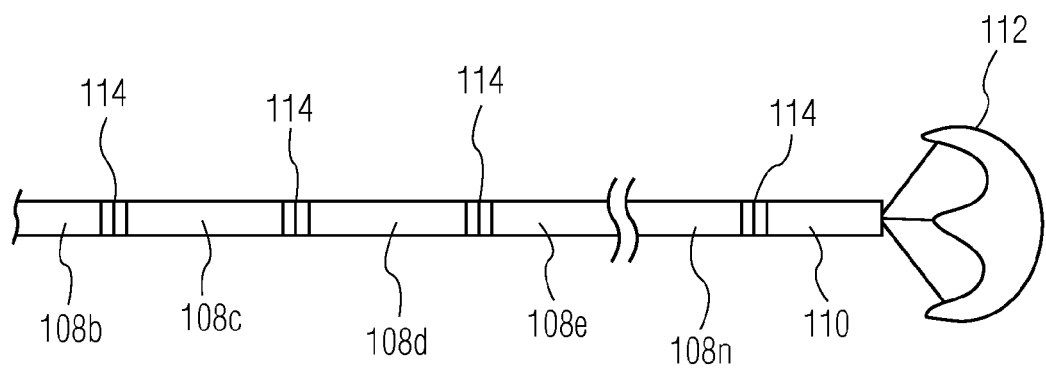
FIG. 1B is a detailed view of a portion of the streamer system of FIG. 1A.

For example, and as shown in FIG. 1B, acoustic module 108c is connected to acoustic module 108d using a coupling 114. Each coupling 114 provides mechanical and optical connectivity and may include a plurality of optical plugs and optical sockets. Each acoustic module 108a, 108b, 108c, 108d, 108e, . . . , 108n may include any number of sensors (e.g., 10 sensors, 20 sensors, etc.), as the term sensor is used herein. Fiber optic acoustic sensor system 100 is a towed system (i.e., towed by vessel 102) and may be termed a streamer system, and in some applications a seismic streamer. Fiber optic acoustic sensor system 100 may also be a towed array for surveillance applications when towed by a surface ship (manned or unmanned) or a submarine (manned or unmanned).

Figure 2A:
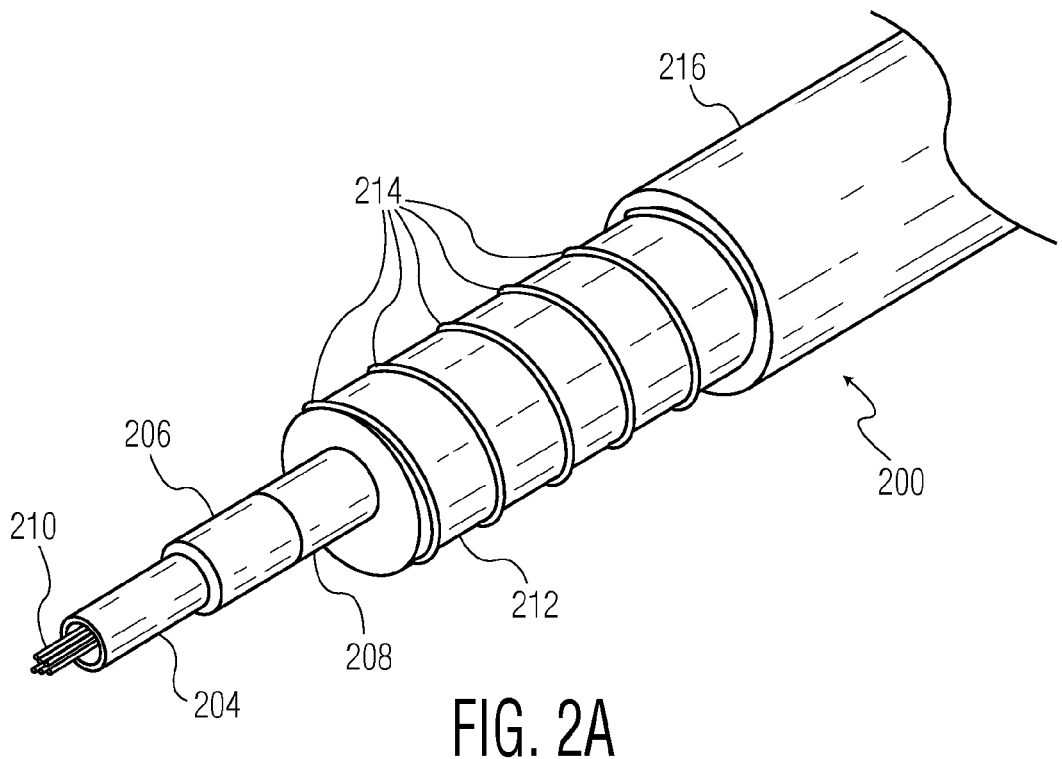
FIGS. 2A-2B are cut-away perspective views of a portion of a fiber optic acoustic array in accordance with an exemplary embodiment of the present invention.
Figure 2B:
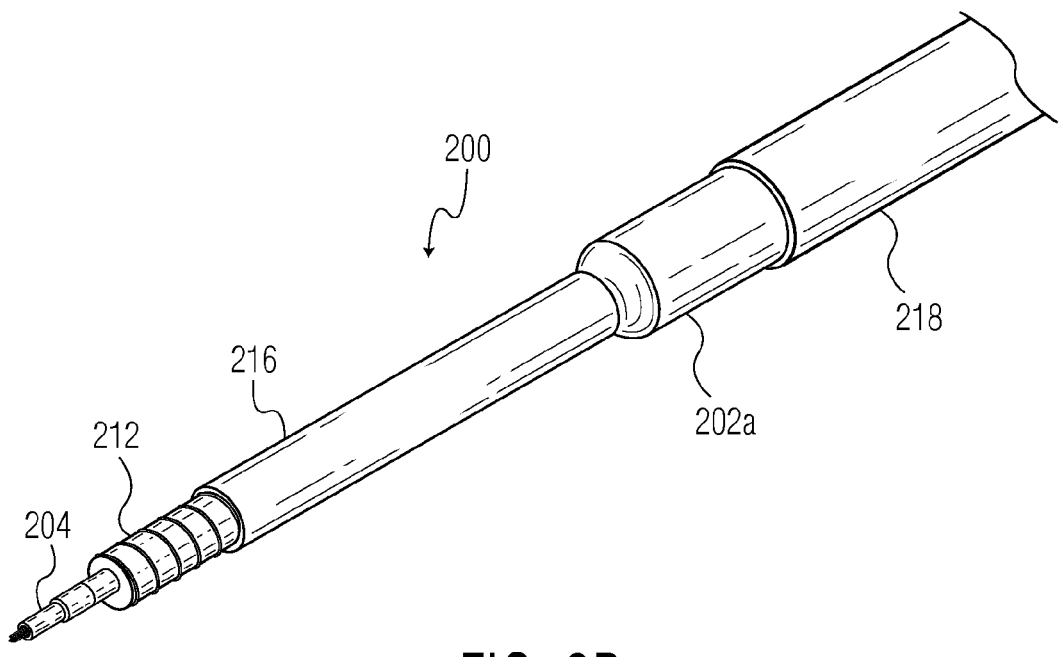
Figure 2C:
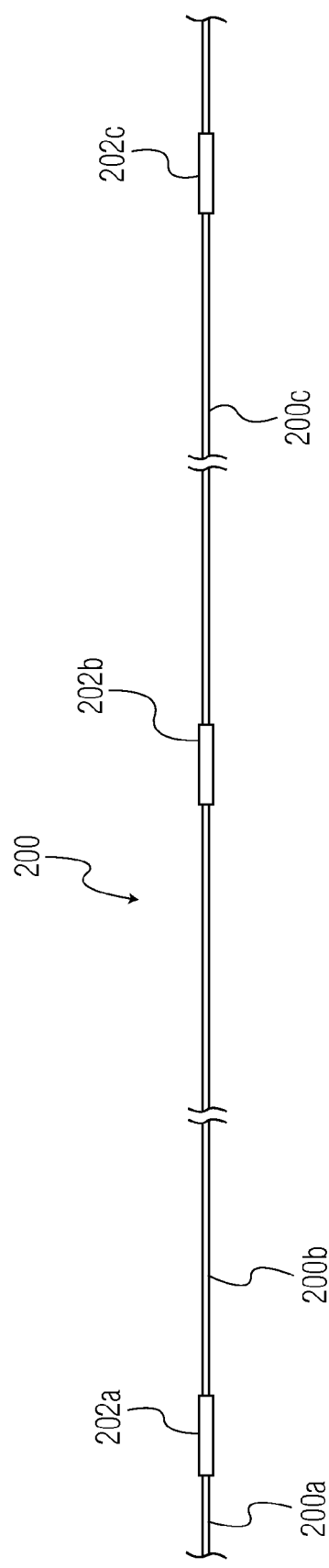
FIG. 2C is a side view of a portion of a larger segment of the fiber optic acoustic array of FIGS. 2A-2B.

The cable structure of fiber optic acoustic sensor array 108 may take a number of different forms. Exemplary cable structures are shown in FIGS. 2A, 2B, 2C, 3, and 4. Referring specifically to FIGS. 2A, 2B, and 2C, a very small length of a fiber optic acoustic sensor array 200 (which may be the type of structure included in sensor array 108 of FIGS. 1A-1B) is shown. The cut-away view of sensor array 200 shown in FIG. 2A includes a core 208 (where exemplary elements of central core 208 include a rope, a wire rope, a polymer rope, a flexible solid rod, a fiber optic cable such as an optical cable 204 shown in FIG. 2A, amongst others). In the illustrated embodiment, core 208 includes a strength member 206 surrounding the optical cable 204. An exemplary material for strength member 206 is Kevlar® synthetic fiber. Kevlar® is a registered trademark of E.I. DuPont de Nemours & Co., Inc. of Wilmington, Del. The core 208 houses a plurality of optical fibers 210, where fibers 210 may be provided as a fiber optic cable and may be referred to as pass-through fibers.

A first polymer coating or layer 212 is applied to (e.g., extruded over) core 208 to a desired thickness. In a specific embodiment, first polymer layer 212 may be foamed or voided, thereby creating a closed cell foam layer which increases the buoyancy of sensor array 200. Following application of first polymer layer 212 to core 208, an optical fiber 214 is wound or wrapped (e.g., in spiral fashion) over first polymer layer 212. An adhesive (e.g., a spray adhesive) or other product may be applied to secure optical fiber 214 in position. A second polymer layer (or coating) 216 (e.g., another layer of the same polymer material as first polymer coating 212) is applied (e.g., extruded) over optical fiber 214 and first polymer layer 212. In this manner, optical fiber 214 is desirably covered on all sides (e.g., sandwiched) by the polymer layers 212, 216, thereby providing the desired acoustic sensitivity enhancement. Optical fiber 214, provided between layers 212 and 216, is used as an acoustic sensor for a towed array/seismic streamer according to certain exemplary embodiments of the present invention. By sequentially applying polymer layer 212, then winding optical fiber 214, and then applying polymer layer 216, a more cost effective process is provided in contrast to conventional processes whereby the entire optical fiber is coated during manufacturing and prior to assembly of the sensor.

Exemplary base materials for polymer layers/coatings are polyether urethane and polyester urethane. Polymer layers 212, 216 may be, for example, neat coatings (e.g., a coating without voiding particles) or voided polymer coatings. In the case of voided polymer coatings, the coatings may be applied with the particles in their finished size and state. Alternatively, particles (e.g., solid polymer pellets) may be blended with a compound (e.g., a foaming agent such as the Expancel® product available from Casco Adhesives AB of Sweden) where the particles expand and create gas-filled spheres when heated during the extrusion process to create the desired voids.

Optically, sensor array 200 may be constructed as an infinite impulse response interferometer array, wherein FBGs are either written into optical fiber 214 prior to winding, or wherein fiber Bragg gratings (FBGs) are spliced into optical fiber 214 at specific locations (e.g., housings 202a, 202b, 202c, etc. described below), thus creating a series of optically connected Fabry-Perot interferometers that can be interrogated using a Time Division Multiplexing demodulator or similar device remote from sensor array 200 (e.g., onboard vessel 102). As is appreciated by those skilled in the art, a fiber Bragg grating is a type of distributed Bragg reflector constructed in a short segment of optical fiber that reflects particular wavelengths of light and transmits all others. This selectivity is achieved by creating a periodic variation in the refractive index of the fiber core, which generates a wavelength-specific dielectric mirror. Therefore, a FBG can be used as an inline optical filter to block certain wavelengths, or as a wavelength-specific reflector.

More specifically, fiber optic acoustic sensor array 200 may be configured as a plurality of cable sections, where an exemplary total length of sensor array 200 may be on the order of hundreds of meters to several kilometers. At certain locations along sensor array 200, a plurality of housings 202a, 202b, 202c, etc. may be provided (e.g., see FIGS. 2B-2C). Housings 202a, 202b, 202c may be geophone/FBG housings provided along the length of sensor array 200. Housings, such as housing 202a along the length of sensor array 200, may also include other elements such as one or more fiber optic accelerometers (see description of accelerometers below in connection with FIG. 5) to provide increased sensitivity to the fiber optic cable in one or more directions.

As shown in FIG. 2B (but omitted from FIG. 2C for simplicity), fiber optic acoustic sensor array 200 includes a hose 218 that surrounds the other elements of sensor array 200 including core 208, polymer layers 212, 216, and optical fiber 214. Exemplary materials for hose 218 are polymer materials such as polyether urethane and poly vinyl chloride. The space between second polymer layer 216 and hose 218 may be filled with an appropriate fill material. Exemplary fill materials include fluids (e.g., water, mineral oil, kerosene-type liquids) or solids. In certain applications, it is desired that the fill material has a very low shear strength that enables the fully fabricated fiber optic acoustic sensor array 200 to minimize certain noise created by certain hydrodynamic conditions during towing.

FIG. 2C illustrates a portion of sensor array 200 including sensors 200a, 200b, 200c separated by respective housings 202a, 202b, 202c. An exemplary spacing between housings 202a, 202b for seismic streamer applications is 12.5 meters. In an embodiment where each housing 202a, 202b, 202c includes an FBG for an appropriate wavelength of light, the signals reflected back to the opto-electronics (e.g., on vessel 102 in FIG. 1A) by a pair of FBGs may be used to interpret the signals received by a given sensor 200a, 200b, 200c.

At certain locations along the length of sensor array 200, a structure (e.g., a rigid tube, not shown) may be attached to sensor array 200 (e.g., over the second polymer layer 216 but inside hose 218) to limit bending of the sensor array 200 which can be a source of self-noise. In one example, a plurality of such structures may be attached (e.g., clamped onto, snapped onto, etc.) to sensor array 200 along its length. In a very specific example, a plurality of roughly four (4) inch-long (about 10 cm) structures may be attached to sensor array 200 at spacings on the order of five (5) feet (152 cm). Such structures may be perforated along their length (e.g., and in some cases, the perforations occupy the majority of the surface of the structure) to allow dynamic pressure changes (acoustic information) to move through the structures and reach optical fiber 214 through second polymer layer 216.

Figure 3:
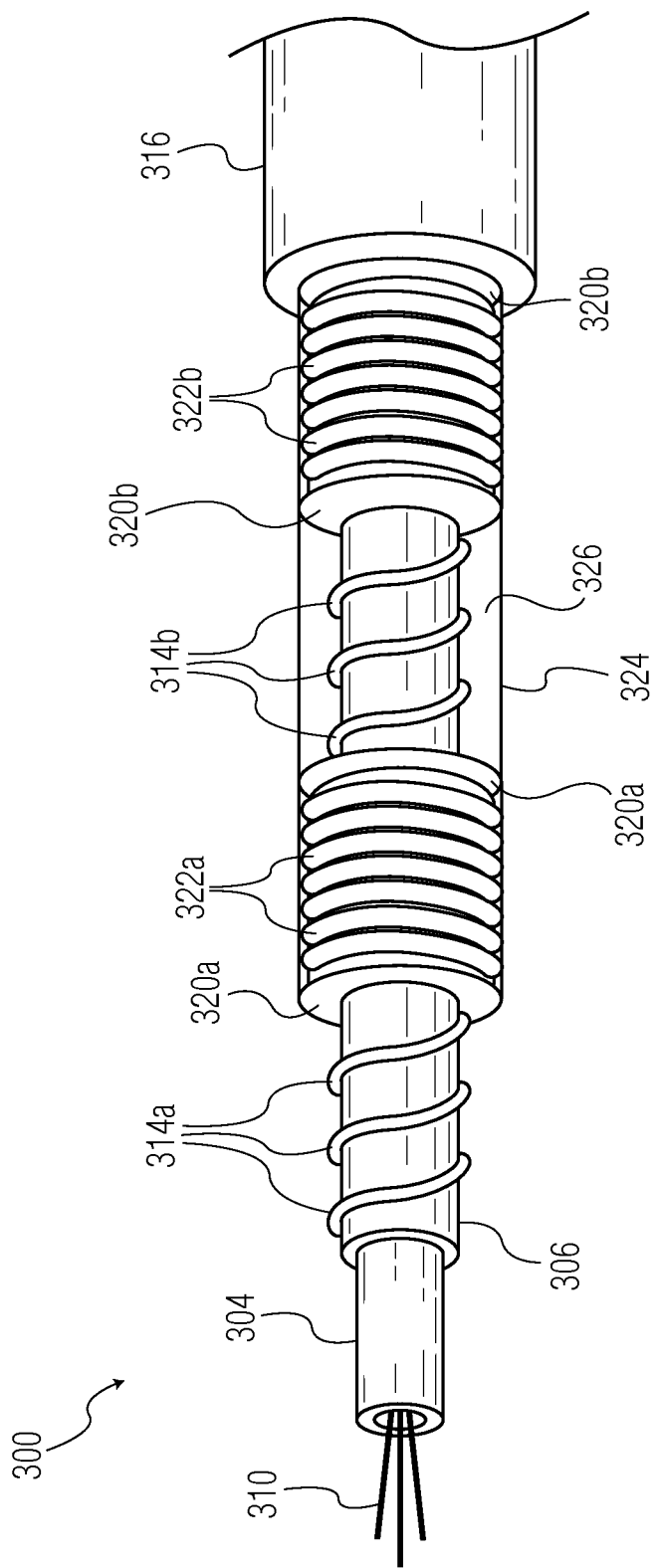
FIG. 3 is a cut-away perspective view of a portion of a fiber optic acoustic array in accordance with another exemplary embodiment of the present invention.

As provided above, FIG. 3 illustrates another exemplary cable structure which may be the type of structure included in sensor array 108 of FIGS. 1A-1B. The cut-away view of a fiber optic acoustic sensor array 300 shown in FIG. 3 includes a core 304 (e.g., a plastic or metal tube) housing a plurality of optical fibers 310, where fibers 310 may be provided as a fiber optic cable and may be referred to as pass-through fibers. A strength member (not shown) may also be included in core 304. In the exemplary embodiment shown in FIG. 3, a layer 306 (e.g., a damping, or lossy, elastomer layer) is provided on core 304 for damping mechanical energy and noise that may propagate along core 304.

As opposed to having the entire length of the optical fiber act as the primary sensor (as shown in connection with FIGS. 2A, 2B, and 2C), the primary sensing in FIG. 3 is done by a plurality of discrete, coiled fiber portions (including a polymer coating applied to the optical fiber included in the coiled fiber portions, where exemplary polymer coatings include polyester urethane, polyether urethane, etc., where the polymer coating may be voided as described above) interspersed along the optical fiber wound on core 304. More specifically, FIG. 3 illustrates a coiled portion of optical fiber 322a (including a polymer coating) provided on a spool 320a. FIG. 3 also illustrates another coiled portion of optical fiber 322b (including a polymer coating) provided on a spool 320b. Between respective spooled portions of coated optical fiber are lengths of uncoated optical fiber 314a, 314b wound around core 304. More specifically, a length of uncoated optical fiber 314b is provided between spooled portions of polymer coated optical fiber 322a and 322b and may be contained within a tube (e.g., of a plastic material) to allow bending of the sensor array 300 without causing undue strain on the uncoated optical fiber 314a, 314b.

Of course, it will be appreciated that while only two spooled portions of polymer coated optical fiber 322a, 322b are shown in FIG. 3 (and two uncoated lengths of optical fiber 314a, 314b), additional spooled portions are contemplated. Further, the length of uncoated optical fiber 314b is shown as relatively short in comparison to the length of fiber within spooled portions 322a, 322b. FIG. 3 also illustrates that both the spooled portions 322a, 322b and the uncoated lengths 314a, 314b may be housed within a housing 324, where housing 324 is filled with a fill material 326. Fill material 326 may be a low shear strength material such as a fluid (e.g., water, mineral oil, etc.) or a solid (a low shear strength gel, for example). An outer jacket 316 surrounds the entire sensor array 300. In an embodiment such as shown in FIG. 3, the spooled portions 322a, 322b are the primary sensing portions. In sensor array 300, any of a number of spooled portions may be included in each sensor. For example, in an embodiment including FBGs that divide the array into a plurality of sensors S1, S2, S3, etc. (e.g., see FIG. 6 described below), each sensor may include a plurality of spooled portions similar to spooled portions 322a, 322b shown in FIG. 3.

Figure 4:
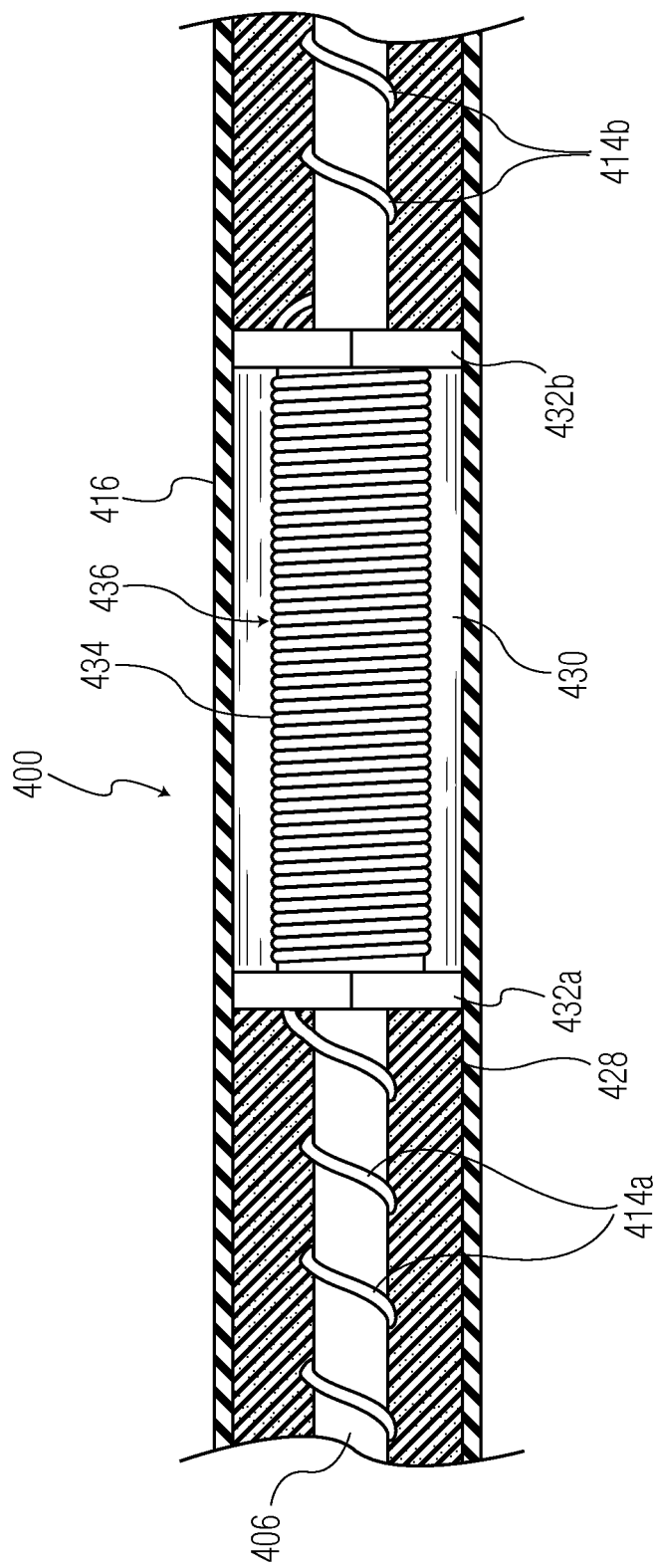
FIG. 4 is a side sectional view of a portion of a fiber optic acoustic array in accordance with yet another exemplary embodiment of the present invention.

As provided above, FIG. 4 illustrates yet another exemplary cable structure which may be the type of structure included in sensor array 108 of FIGS. 1A-1B. A fiber optic acoustic sensor array 400 of FIG. 4 is very similar to sensor array 300 of FIG. 3 except that, in FIG. 4, as detailed below, a spooled portion 436 is surrounded by a low shear strength material that is different from the material surrounding the uncoated fiber lengths 414a, 414b. Sensor array 400 shown in FIG. 4 includes a core 406 (e.g., a plastic or metal tube) that houses a plurality of optical fibers (not shown). As opposed to having the entire length of the optical fiber act as the primary sensor (as shown in connection with FIGS. 2A, 2B, and 2C), the primary sensing in FIG. 4 is done by a plurality of coiled fiber portions (having a polymer coating directly on the fiber) interspersed along the optical fiber wound on core 406.

More specifically, FIG. 4 illustrates a coiled portion of optical fiber 434 (including a polymer coating applied to the optical fiber, where exemplary polymer coatings include polyester urethane, polyether urethane, etc.) provided as spooled portion 436, where spooled portion 436 includes spool walls 432a, 432b. While only one spooled portion 436 is shown in FIG. 4, it will be appreciated that a plurality of such spooled portions may be included in each sensor of sensor array 400. Between respective spooled portions 436 of coated optical fiber 434 are lengths of uncoated optical fiber 414a, 414b wound around core 406. Thus, as opposed to conventional techniques, only the portion of optical fiber wound on the spooled portion(s) 436 is directly coated with a polymer material. A benefit of spooled portion(s) 436 is that the spool acts as a stiffener that substantially prevents straining (e.g., bending) of sensor array 400 at predefined locations, and the spool walls 432a, 432b allow for the targeted use of a specific low shear strength material (e.g., a low shear strength gel).

Spooled portion(s) 436, as well as uncoated optical fibers 414a, 414b, are housed within an outer jacket 416. The area between uncoated optical fibers 414a, 414b (wound on core 406) and outer jacket 416 is filled with a fill material 428. An exemplary fill material 428 is a solid voided elastomer material. The area between spooled portion 436 and jacket 416 (also confined by spool walls 432a, 432b) is filled with a fill material 430. An exemplary fill material 430 is a low shear strength material such as a low shear gel. In an embodiment such as shown in FIG. 4, the spooled portions 436 are the primary sensing portions. In sensor array 400, any of a number of spooled portions 436 may be included in each sensor. For example, in an embodiment including FBGs that divide the array into a plurality of sensors S1, S2, S3, etc. (e.g., see FIG. 6 described below), each sensor may include a plurality of spooled portions 436.

In any of the exemplary embodiments of the present invention shown in FIGS. 2A, 2B, 2C, 3, and 4, accelerometers may be inserted into the respective sensor array 200, 300, 400 as desired. For example, accelerometers such as those illustrated and described in connection with International Publication No. WO 2011050227 A4 may be utilized. As will be appreciated by those skilled in the art, the portion of the optical fiber wound between a moving portion and a fixed portion of such an accelerometer will tend to have greatly increased sensitivity along a single sensing axis. In an exemplary fiber optic acoustic sensor array 500 shown in FIG. 5 (which may be an array configured such as any of those shown in FIGS. 2A, 2B, 2C, 3, and 4), accelerometers 540a, 540b are interspersed along a core 506 (where optical fibers 514a, 514b are wound around core 506).

Figure 5:
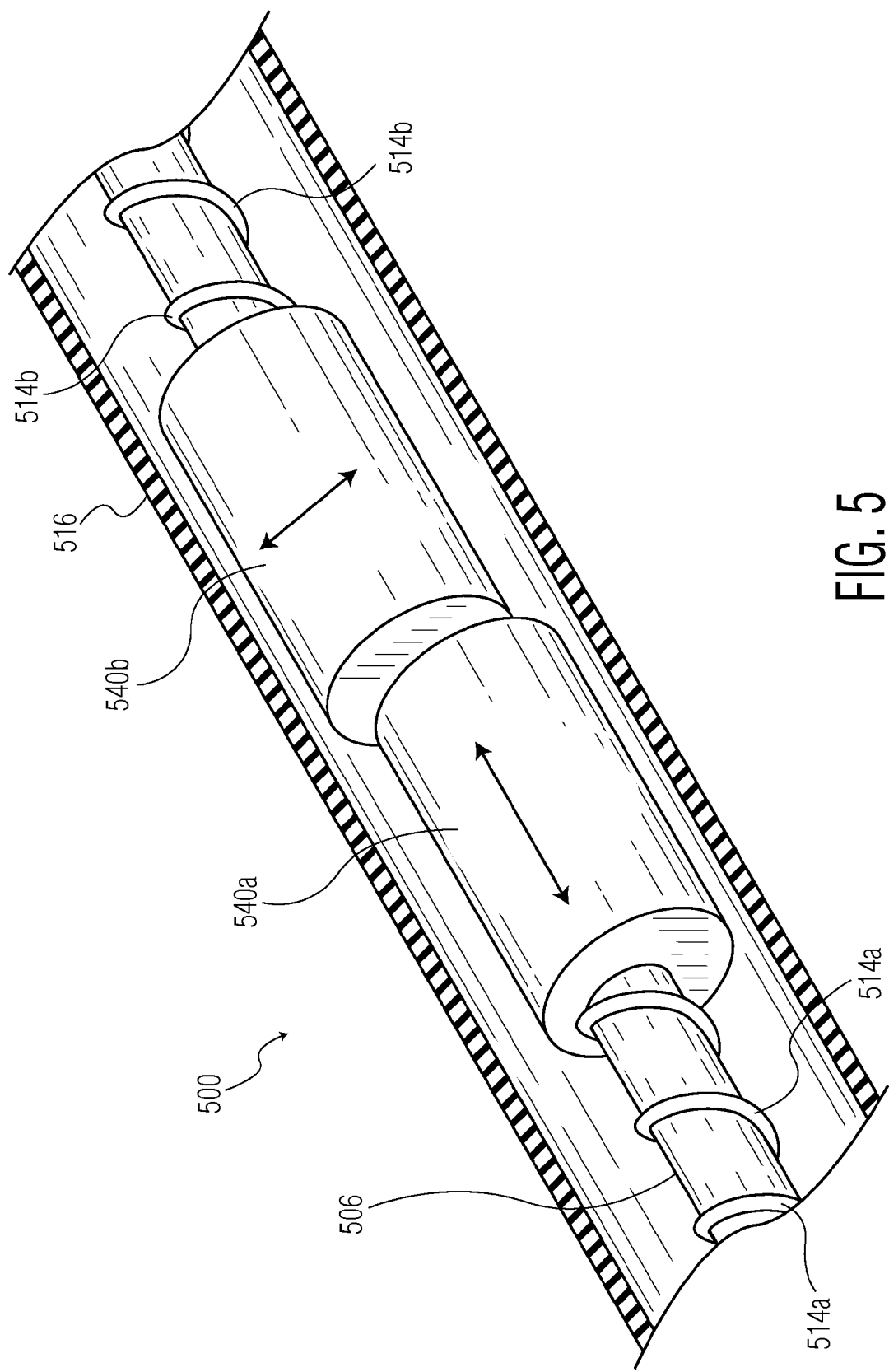
FIG. 5 is a perspective sectional view of a portion of a fiber optic acoustic array in accordance with yet another exemplary embodiment of the present invention.

More specifically, an optical fiber 514a is wound around core 506 and then enters accelerometer 540a. In accelerometer 540a, optical fiber 514a is wound between a fixed portion of accelerometer 540a and a moveable portion of accelerometer 540a, thereby sensing relative motion between the fixed portion and the moveable portion. Optical fiber 514b is also wound around core 506 and enters accelerometer 540b. Optical fiber 514b is wound between a fixed portion of accelerometer 540b and a moveable portion of accelerometer 540b. According to an exemplary embodiment of the present invention, accelerometer 540a may be used to sense motion along a first axis (i.e., the moveable portion moves substantially linearly along a first motion axis in comparison to the fixed portion), while accelerometer 540b may be used to sense motion along a second axis that is substantially perpendicular to the first axis. For maximum sensitivity, accelerometers 540a, 540b may be housed within substantially incompressible housings where the combination of each housing and its contents is neutrally buoyant (i.e., the combination has the same combined mass as the equivalent volume of water). Illustrated in FIG. 5 is an outer jacket 516 that surrounds the entire sensor array 500. As provided above, the inclusion of one or more accelerometers (such as those shown in FIG. 5) in a sensor may be in addition to the other sensor portions in a given array 200, 300, 400, 500.

As will be appreciated by those skilled in the art, the various exemplary fiber optic acoustic sensor arrays 200, 300, 400, 500 described herein may be included in a variety of different fiber optic acoustic sensor system arrangements such as an FBG based system, a TDM (i.e., time division multiplexed) based system, a WDM (i.e., wavelength division multiplexed) based system, a FDM (i.e., frequency division multiplexed) based system, Michelson based interferometer systems, Mach-Zehnder based interferometer systems, etc.

Figure 6:
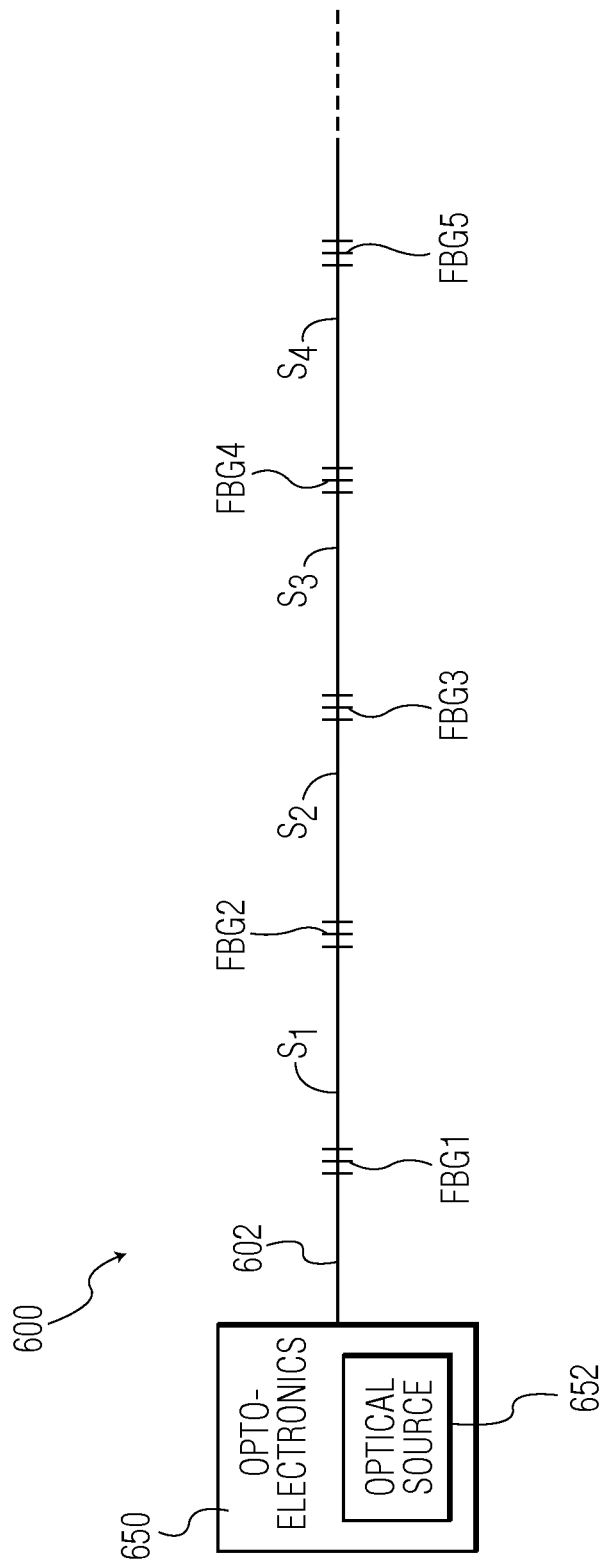
FIG. 6 is a block diagram illustrating a portion of a fiber optic acoustic array including sensors in a Fabry Perot configuration in accordance with an exemplary embodiment of the present invention.

FIG. 6 illustrates a portion of a fiber optic acoustic sensor system 600 in a TDM based Fabry Perot based configuration. Sensor system 600 includes an optical source 652 (included in opto-electronics 650 in FIG. 6, and included on vessel 102 in an embodiment such as shown in FIG. 1A) that provides an optical signal along a fiber optic acoustic sensor array 602. Fiber optic acoustic sensor array 602 may be of a type described above with respect to any of sensor arrays 200, 300, 400, and 500 (or any other arrays within the scope of the present invention). Fiber optic acoustic sensor array 602 includes a plurality of FBGs (fiber Bragg gratings), namely, FBG1, FBG2, FBG3, FBG4, FBG5, etc. which divide respective sensors S1, S2, S3, S4, etc. from one another.

For example, sensor S1 is the portion of sensor array 602 between FBG1 and FBG2. As will be appreciated by those skilled in the art, a portion of the optical signal (e.g., a predetermined wavelength of the optical signal) sent by optical source 652 is reflected by FBG1 back to an optical receiver (not shown, but included in opto-electronics 650 in FIG. 6, and included on vessel 102 in an embodiment such as shown in FIG. 1A). Likewise, another portion of the optical signal (at the same wavelength as is reflected by FBG1) sent by optical source 652 is reflected by FBG2 back to the optical receiver. By analyzing the returned signal portions, opto-electronics 650 is able to interpret the signals received from sensor S1 (i.e., the sensor between FBG1 and FBG2). The process is similar for each of the additional sensors S2, S3, S4, S5, etc. As provided above, any of the fiber optic acoustic sensor arrays described herein (e.g., sensor arrays 200, 300, 400, 500, etc.) may be used in the configuration of FIG. 6. In the specific example of FIG. 2C, a given sensor 200a, 200b, 200c would each correspond to a sensor S1, S2, S3, S4, S5, etc. Pairs of FBGs (e.g., FBG1 and FBG2) bounding sensors (e.g., sensor S1) may be of unique wavelengths, different from the wavelengths utilized by other sensors to allow use of a single optical fiber for more than one wavelength of light to service a larger number of sensors.

Figure 7:
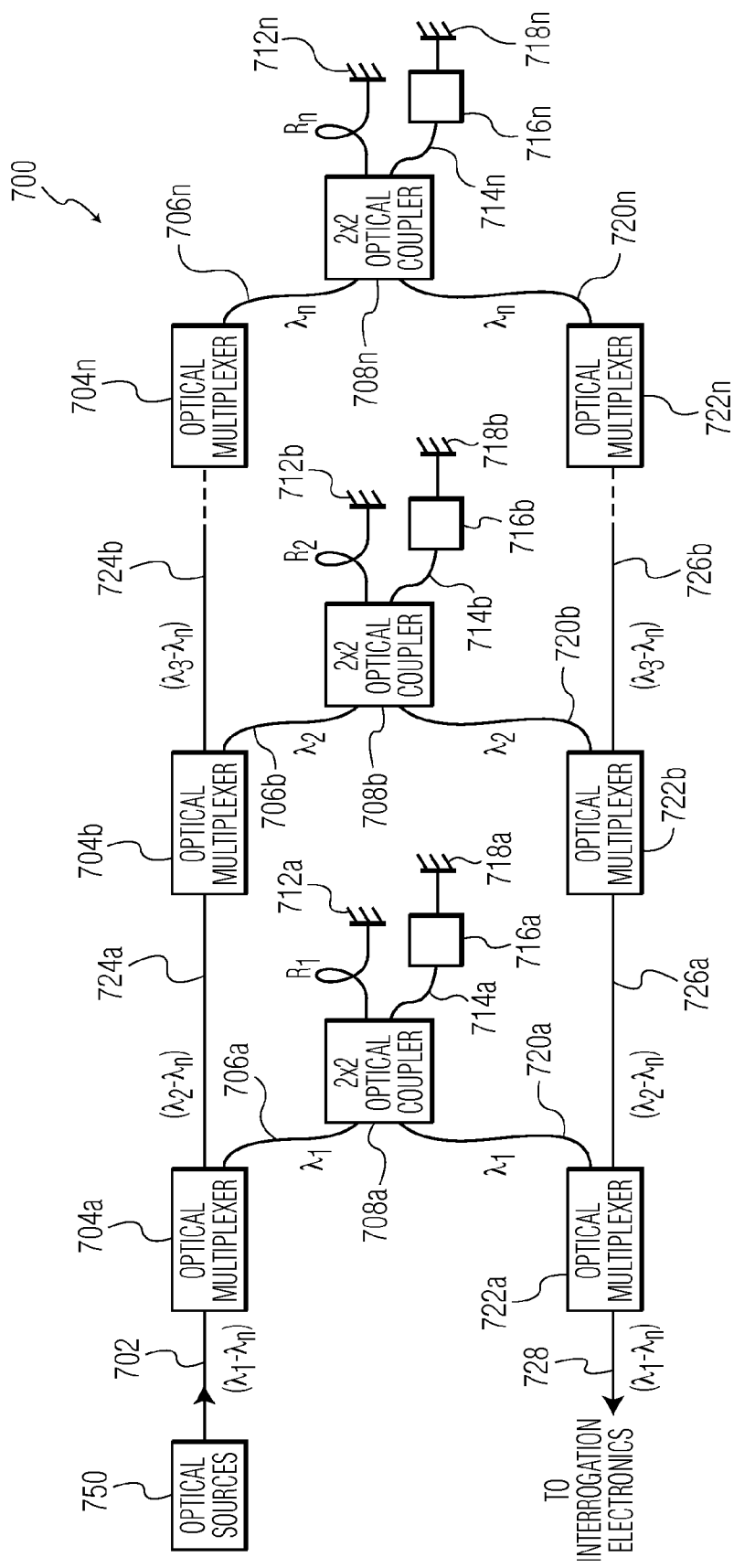
FIG. 7 is a block diagram illustrating a portion of a fiber optic acoustic array including sensors in a wavelength division multiplexed configuration in accordance with an exemplary embodiment of the present invention.

FIG. 7 illustrates a portion of a fiber optic acoustic sensor system 700 (e.g., a WDM based system) where sensors are multiplexed in wavelength using a ladder configuration. Sensor system 700 includes a plurality of optical sources 750 (e.g., included on vessel 102 in an embodiment such as shown in FIG. 1A) that provide optical signals including wavelengths $\lambda 1$-$\lambda n$ along an optical fiber 702 to an optical multiplexer 704a. Optical multiplexer 704a (such as an in-line, 3-port, All Optical Add Drop Multiplexer commonly used in fiber optic telecommunications) divides an optical signal into a first portion (corresponding to wavelength $\lambda 1$) and a second portion (corresponding to wavelengths $\lambda 2$-$\lambda n$). The portion of the optical signal that corresponds to wavelength $\lambda 1$ is sent along an optical fiber 706a to an optical coupler 708a which divides the signal into (1) a first portion sent to a reference coil R1 and returned to optical coupler 708a by a reflector 712a, and (2) a second portion sent along an optical fiber 714a to a sensor 716a (such as a fiber optic hydrophone) and returned to optical coupler 708a by a reflector 718a. As will be appreciated by those skilled in the art, sensor 716a (and other sensors shown in FIG. 7 including sensors 716b, 716n, etc.) may be any sensor described herein according to the present invention such as, for example, the dynamic pressure sensors (hydrophones) and/or optical fiber accelerometers of sensor arrays 200, 300, 400, 500 shown in FIGS. 2A, 2B, 2C, 3, 4, and 5. In a specific example, sensor 716a may be a sensor such as sensor 200a, 200b, or 200c shown in FIG. 2C.

Referring again to FIG. 7, the signals reflected back from reflectors 712a and 718a recombine at optical coupler 708a and are sent along an optical fiber 720a to an optical multiplexer 722a to be recombined with optical signals transmitted along an optical fiber 726a, and then sent back along an optical fiber 728 to the interrogation electronics (not shown, but illustrated by the words "TO INTERROGATION ELECTRONICS" in FIG. 7, and included on vessel 102 in an embodiment such as shown in FIG. 1A). The process is repeated for the other wavelengths of the optical signals.

For example, an optical signal including wavelengths $\lambda 2$-$\lambda n$ is provided to an optical multiplexer 704b along an optical fiber 724a. Optical multiplexer 704b divides the optical signal into a first portion (corresponding to wavelength λ2) and a second portion (corresponding to wavelengths λ3-λn). The portion of the optical signal that corresponds to wavelength λ2 is sent along an optical fiber 706b to an optical coupler 708b which divides the signal into (1) a first portion sent to a reference coil R2 and returned to optical coupler 708b by a reflector 712b, and (2) a second portion sent along an optical fiber 714b to a sensor 716b and returned to optical coupler 708b by a reflector 718b. The signals reflected back from reflectors 712b and 718b recombine at optical coupler 708b and are sent along an optical fiber 720b to an optical multiplexer 722b to be recombined with optical signals transmitted along an optical fiber 726b, and then sent back along an optical fiber 726a to optical multiplexer 722a to be recombined and sent to the interrogation electronics.

Likewise, the optical signal including wavelengths λ3-λn is sent along an optical fiber 724b to the next optical multiplexer (not shown) for similar processing. The final optical signal (corresponding to wavelength λn) is received by an optical multiplexer 704n, sent along an optical fiber 706n to an optical coupler 708n. At optical coupler 708n, the optical signal is divided into (1) a first portion sent to a reference coil Rn and returned to optical coupler 708n by a reflector 712n, and (2) a second portion sent along an optical fiber 714n to a sensor 716n and returned to optical coupler 708n by a reflector 718n. The signals reflected back from reflectors 712n and 718n recombine at optical coupler 708n and are sent along an optical fiber 720n to an optical multiplexer 722n for recombination and ultimately to be sent to the interrogation electronics.

As will be appreciated by those skilled in the art, certain groups of elements shown in FIG. 7 may be included in one or more housings provided along the length of sensor array 700. In an example where sensor array 700 is configured similar to sensor array 200 shown in FIGS. 2A, 2B, and 2C, housings (such as housing 202a shown in FIG. 2B) may be used to house such elements. In a very specific example, housing 202a shown in FIG. 2B may include optical multiplexer 704a, optical fiber 706a, optical coupler 708a, reference coil R1, reflector 712a, optical fiber 720a, and optical multiplexer 722a.

According to the various exemplary embodiments of the present invention recited herein, improved fiber optic acoustic sensor arrays (and related fiber optic acoustic sensor systems) are provided which are well suited to the challenges associated with the manufacturing, deployment, retrieval, and long-term towing of underwater seismic streamers, towed hydrophone arrays and other sensor systems. Specific exemplary applications of the fiber optic acoustic sensor arrays and systems are: (1) underwater seismic profiling such as for underwater drilling studies; and (2) other applications where such an array is used to determine the location of a target (e.g., another vessel) by identifying the acoustic noise generated or reflected by such a target.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A fiber optic acoustic sensor system comprising:
an optical source; and
a fiber optic acoustic sensor array configured to receive an optical signal from the optical source, the fiber optic acoustic sensor array including a core, an optical fiber wound around the core, the optical fiber including a plurality of coiled fiber portions, each of the coiled fiber portions being provided on a respective spool portion, the coiled fiber portions being coated with a polymer coating, the optical fiber also including uncoated fiber portions between each of the respective spool portion, wherein the plurality of discrete coiled fiber portions act as a plurality of sensors of the fiber optic acoustic sensor array.

2. The fiber optic acoustic sensor system of claim 1 the fiber optic acoustic sensor system further comprising an interrogator for measuring optical signals in each of the plurality of sensors resulting from acoustic inputs received at each of the plurality of sensors.

3. The fiber optic acoustic sensor system of claim 1 wherein the plurality of sensors are multiplexed in wavelength using a ladder configuration.

4. The fiber optic acoustic sensor system of claim 1 further comprising a hose surrounding at least a portion of the fiber optic acoustic sensor array.

5. The fiber optic acoustic sensor system of claim 4 further comprising a fill material between the hose and the fiber optic acoustic sensor array.

6. The fiber optic acoustic sensor system of claim 5 wherein the fill material is selected from the group consisting of liquid and a low shear strength polymer material.

7. The fiber optic acoustic sensor system of claim 1 wherein the core contains a plurality of optical fibers.

8. The fiber optic acoustic sensor system of claim 1 wherein the polymer coating includes at least one of a polyether urethane material or a polyester urethane material.

9. The fiber optic acoustic sensor system of claim 1 wherein the polymer coating is a voided layer.

10. The fiber optic acoustic sensor system of claim 1 wherein the fiber optic acoustic sensor array includes a plurality of fiber Bragg gratings along the optical fiber thereby defining a plurality of sensing sections along the optical fiber.

11. The fiber optic acoustic sensor system of claim 1 wherein the fiber optic acoustic sensor array includes a plurality of fiber optic accelerometers, wherein portions of optical fiber integrated with, or connected to, the optical fiber wound around the first polymer layer are wrapped around elements of the fiber optic accelerometers.

12. A fiber optic acoustic sensor array comprising:
a core; and
an optical fiber wound around the core, the optical fiber including a plurality of coiled fiber portions, each of the coiled fiber portions being provided on a respective spool portion, the coiled fiber portions being coated with a polymer coating, the optical fiber also including uncoated fiber portions between each of the respective spool portion, wherein the plurality of discrete coiled fiber portions act as a plurality of sensors of the fiber optic acoustic sensor array.

13. The fiber optic acoustic sensor array of claim 12 further comprising a hose surrounding at least a portion of the optical fiber.

14. The fiber optic acoustic sensor array of claim 13 further comprising a fill material between the hose and the optical fiber.

15. The fiber optic acoustic sensor array of claim 14 wherein the fill material is selected from the group consisting of liquid and a low shear strength polymer material.

16. The fiber optic acoustic sensor array of claim 12 wherein the core contains a plurality of optical fibers.

17. The fiber optic acoustic sensor array of claim 12 wherein the polymer coating includes at least one of a polyether urethane material or a polyester urethane material.

18. The fiber optic acoustic sensor array of claim 12 wherein the polymer coating is a voided layer.

19. The fiber optic acoustic sensor array of claim 12 further comprising a plurality of fiber Bragg gratings along the optical fiber, thereby defining a plurality of sensing sections along the optical fiber.

20. The fiber optic acoustic sensor array of claim 12 further comprising a plurality of fiber optic accelerometers, wherein portions of optical fiber integrated with, or connected to, the optical fiber wound around the first polymer layer are wrapped around elements of the fiber optic accelerometers.

* * * * *